(12) United States Patent
Block

(10) Patent No.: US 6,782,581 B2
(45) Date of Patent: Aug. 31, 2004

(54) WIPER DEVICE, ESPECIALLY FOR WINDSHIELDS OF AUTOMOBILES

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,373
(22) PCT Filed: Jul. 11, 2001
(86) PCT No.: PCT/DE01/02598
  § 371 (c)(1),
  (2), (4) Date: Sep. 30, 2002
(87) PCT Pub. No.: WO02/051677
  PCT Pub. Date: Jul. 4, 2002

(65) Prior Publication Data
  US 2003/0074762 A1 Apr. 24, 2003

(30) Foreign Application Priority Data
  Dec. 23, 2000 (DE) .......................................... 100 65 014

(51) Int. Cl.[7] ................................................. B60S 1/40
(52) U.S. Cl. ...................... 15/250.32; 403/24; 403/325; 403/327
(58) Field of Search ......................... 15/250.32, 250.31, 15/250.43, 250.44; 403/24, 325, 327

(56) References Cited

U.S. PATENT DOCUMENTS

| | | | | | |
|---|---|---|---|---|---|
| 2,432,689 A | * | 12/1947 | Smulski | .................... | 15/250.32 |
| 2,432,691 A | * | 12/1947 | Smulski | .................... | 15/250.32 |
| 2,432,693 A | * | 12/1947 | Anderson | ................ | 15/250.32 |
| 2,548,090 A | * | 4/1951 | Anderson | ................ | 15/250.32 |
| 2,932,843 A | * | 4/1960 | Zaiger et al. | ............ | 15/250.32 |
| 2,946,078 A | * | 7/1960 | Deibel et al. | ............ | 15/250.32 |
| 2,946,914 A | * | 12/1960 | Anderson | ................ | 15/250.32 |
| 2,965,915 A | * | 12/1960 | Krohm | .................... | 15/250.32 |
| 3,147,507 A | | 9/1964 | Glynn | | |
| 3,425,089 A | * | 2/1969 | Quinian et al. | .......... | 15/250.32 |

FOREIGN PATENT DOCUMENTS

| | | |
|---|---|---|
| DE | 10 28 896 B | 6/1954 |
| DE | 23 13 689 A | 10/1974 |

* cited by examiner

Primary Examiner—Gary K. Graham
(74) Attorney, Agent, or Firm—Michael J. Striker

(57) ABSTRACT

A wiper system has a driveable wiper arm (20) guided at one end on the motor vehicle. A long-straggling wiper blade (12) capable of being placed against the window (16) with a wiper strip (22) is detachably hinge-mounted via a connection device (18) that has a pivot bolt (24) on the arm side. The axis of articulation of the pivot bolt extends substantially transversely to the longitudinal direction of the wiper blade in the working direction of the wiper system. The system includes a coupling part (26) on the wiper-blade side in a center section of the wiper blade (12) on its side opposite from the window (16) having a bore-like bearing receptacle for a pivot bolt (24). The bearing receptacle is provided with a bottleneck (94) capable of being expanded elastically to the diameter (92) of the pivot bolt.

11 Claims, 5 Drawing Sheets

WIPER DEVICE, ESPECIALLY FOR WINDSHIELDS OF AUTOMOBILES

BACKGROUND OF THE INVENTION

A wiper system according to the invention comprises the driven wiper arm as well as the wiper blade to be fastened on its one exposed end. The connection device required for this has appropriately developed coupling means corresponding with each other on the arm side and the blade side.

In the case of a known wiper system (DE 23 13689 A1), the wiper blade belonging to the wiper system and its coupling pan has a guide channel open toward a main body of the wiper strip, in which a hair pin-shaped retaining spring is displaceable between an installation position and a locked position. This retaining spring serves to open or close a recess located in the coupling part that represents the bearing receptacle for the wiper arm-pivot bolt. The retaining spring is preloaded toward a rubber main body of the wiper strip so that the friction between the rubber and the spring must be overcome in order to displace the spring. On the one hand, the ability of the spring to be displaced must be easy to manage for the user, e.g., when replacing the wiper blade, and, on the other hand, the spring must reliably close the bearing receptacle in the channel wall during the wiping operation so that the wiper blade cannot detach unintentionally from the wiper arm. These two opposing requirements cannot be fulfilled equally to satisfaction.

In the case of another wiper system (DE-PS 10 28 896) that does not have this deficiency, a coupling part on the wiper blade side is integrally molded to the rubber-elastic wiper strip. The coupling part has a bore-type bearing receptacle for a pivot bolt on the arm side that can be inserted in the bearing receptacle of the wiper blade transversely to its longitudinal axis via an elastically-expandable installation slot. This type of articulation may function reliably at best at low driving speeds and in the presence of small amounts of precipitation in the form of rain. When precipitation is strong and/or driving speeds are high, or precipitation is present in the form of snow, particularly in the form of wet snow, the forces exerted by the wiper blade on the articulation can exceed the holding power of the rubber-elastic coupling part and detach the wiper blade from the wiper arm.

SUMMARY OF THE INVENTION

The wiper system according to the invention is unique by virtue of a simple end functionally-secure articulation between the wiper arm and wiper blade. The attach the wiper blade to the wiper arm, its pivot bolt is inserted into the bearing receptacle of the wiper blade while the bottleneck is temporarily elastically expanded, whereby the locking element is moved into its open position against the return force, so that the pivot bolt reaches it bearing receptacle. The return force then automatically moves the locking element into Its locked position. The locking element can be produced out of a material that is so stiff that the operating forces acting on the point of articulation are absorbed between the wiper blade and the wiper arm without any negative consequences for the articulation.

A simple design of the wiper system results from the fact that the coupling part has a housing part that is permanently interconnected with the wiper blade, on which said housing part the locking element is displaceably guided in the longitudinal direction of the wiper blade.

In order to obtain a particularly robust design of the coupling for attaching the wiper blade to the wiper arm, the housing part has two guide walls that extend in the longitudinal direction of the wiper blade and are located at a distance from each other, between which the locking element is displaceably guided.

When, in a further embodiment of the invention, the bearing receptacle for the pivot bolt of the wiper arm penetrates the two guide walls as well as the locking element, whereby the recesses in the guide walls adapted to the cross section of the pivot bolt and the locking element located in the locked position complement each other to at least approximately form a circle, as viewed in the direction of the axis of articulation, the result is a functionally-secure, free-from-play fixing into position of the wiper arm-side pivot bolt in the coupling part of the wiper blade, therefore resulting as well in a smooth motion of the wiper blade over the window to be wiped. So that the wiper blade can also be attached to the wiper arm by individuals not skilled in the art, each of the bearing receptacle sections developed in this fashion is open toward the side of the coupling part opposite from the window over one section of the pass-through channel each, whereby the width of each pass-through channel section is greater than the diameter of the pivot bolt.

The locking element is preferably loaded toward the locked position by spring means supported on the housing part. This can be obtained in cost-effective fashion by means of a helical compression spring forming the spring means.

Installation of the coupling part can be simplified by the fact that the spring means are formed by a leg spring interconnected as a single component with the housing part composed of an elastic plastic.

When the bearing section of the locking element is provided with a starting incline that is opposite from its recess at a distance and that forms an acute angle α with the direction of displacement of the locking element, the detachment of the wiper blade from the wiper arm can be achieved in simple fashion by moving the locking element into its open position, whereby the starting incline presses the pivot bolt out of the bearing sections into the guide walls.

A permanently stable guidance of the locking element between the two guide walls is obtained when the two guide walls are interconnected by a bridge at one end section of the housing part.

In order to prevent mistakes during installation of the locking element in the housing part, the housing part has means for ensuring a defined working motion for the locking element located at a distance from the wiper strip.

These means can be formed in cost-effective fashion by means of at least one strip-like projection on the inside of one guide wall that extends in the direction of the working motion of the locking element and with which a longitudinal groove matched to the cross section of the projection and located on the side wall of the locking element facing the projection is associated.

To secure the locking element in the housing part, a limiting shoulder pointing in the direction opposite from the working direction is situated on said housing part, which said limiting shoulder cooperates with a counter-shoulder located on the locking element.

A further means for obtaining a free-from-play guidance of the wiper blade on the wiper arm can be obtained by the fact that the wiper arm has two side walls situated at a distance from each other and parallel to each other at least in the region of the pivot bolt, which said side walls are arranged standing upright on the window, and on which the ends of the wiper arm are fastened, whereby the distance between the two side walls is matched to the width of the coupling part. The two side walls therefore overlap the outer sides of the two guide walls opposite from each other in a manner that is free from play and covers a large area.

A particularly low and easy-to-build wiper blade is obtained when the coupling part is held on the top surface—opposite from the window—of a band-like long-straggling, spring-elastic carrier element, whereby it lies flat on said carrier element over at least one subsection, and when, furthermore, a rubber-elastic wiper strip capable of being placed against the window and arranged parallel to the longitudinal axis is located on the bottom band surface of the carrier element facing the window.

Further advantageous further developments and embodiments of the invention are presented in the subsequent description of exemplary embodiments illustrated in the associated drawings.

BRIEF DESCRIPTION OF THE DRAWINGS

FIG. 13 shows a top view of the coupling part according to FIG. 12.

DETAILED DESCRIPTION OF THE PREFERRED EMBODIMENTS

Figure 1:
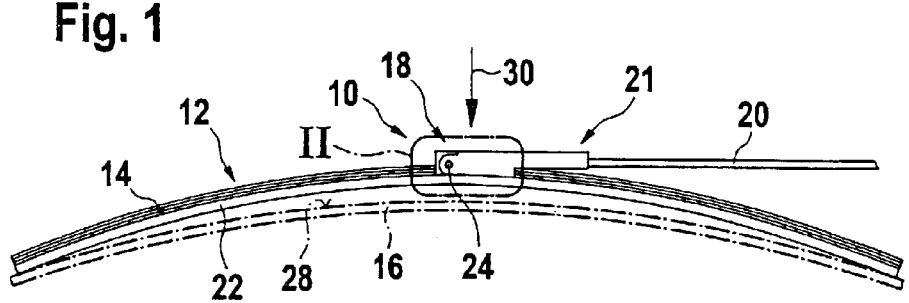
FIG. 1 shows a side view of the schematic illustration of a wiper system according to the invention.
Figure 2:
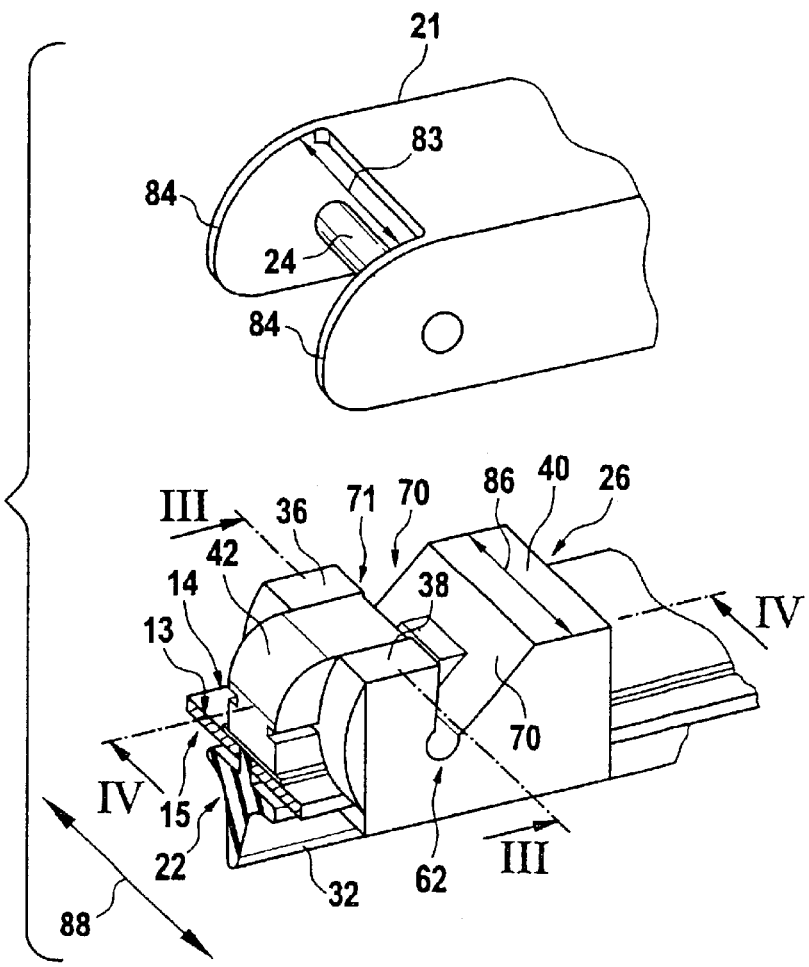
FIG. 2 shows the enlarged perspective illustration of a detail labelled "II" in FIG. 1, whereby the wiper blade is detached from the wiper arm.

A wiper system 10 shown in FIGS. 1 and 2 has a wiper blade 12 with a band-like long-straggling, spring-elastic carrier element 14. A connection device 18 lying flat on the carrier element is located on the top surface of the band 13 of the carrier element opposite from the window 16 to be wiped, with the aid of which said connection device 18 the wiper blade 12 can be detachably interconnected with a driveable wiper arm 20 belonging to the wiper system and guided at one end on the body of a motor vehicle. A long-straggling, rubber-elastic wiper strip 22 is situated parallel to the longitudinal axis on the bottom band surface 15 of the carrier element 14 facing the window 16. A pivot bolt 24 serving as a coupling means on the arm side is held on the exposed end 21 of the wiper arm 20, which said pivot bolt is supported in a bearing receptacle of a coupling part 26 on the wiper blade side. The exposed end of the wiper arm 20 is loaded in the direction of the arrow 30 toward the window 16 to be wiped, the surface to be wiped of which is represented in FIG. 1 by a dash-dotted line 28. Since the dash-dotted line 28 is intended to represent the greatest curvature of the window surface, it is obvious that the curvature of the wiper blade 12 lying against the window with its two ends is greater than the maximum curvature of the window. Under the contact pressure (arrow 30), the wiper blade bears against the window surface 28 with its wiper lip 32 along its entire length. A tension therefore builds up in the band-like, spring-elastic carrier element 14 that ensures that the wiper strip 22 or the wiper lip 32 is seated properly against the motor vehicle window 16 along its entire length. Due to the use of the carrier element 14, a wiper blade carrier strap system (DE-PS 15 05 397) known for a long time is rendered superfluous.

Figure 4:
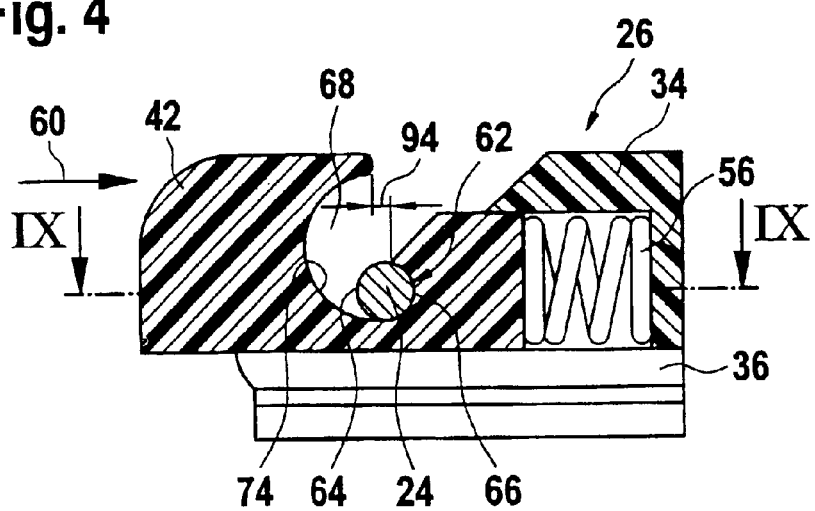
FIG. 4 shows a partial longitudinal sectional drawing through the wiper blade located in the attached position along the line IV—IV in FIG. 2.
Figure 8:
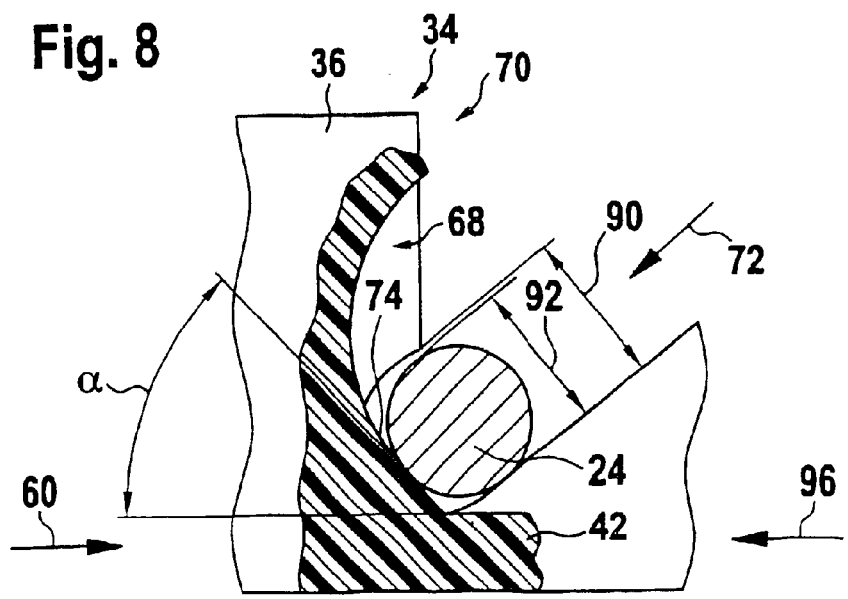
FIG. 8 shows an enlarged partial illustration of the arrangements according to FIGS. 4 and 6 in an intermediate detaching position.
Figure 9:
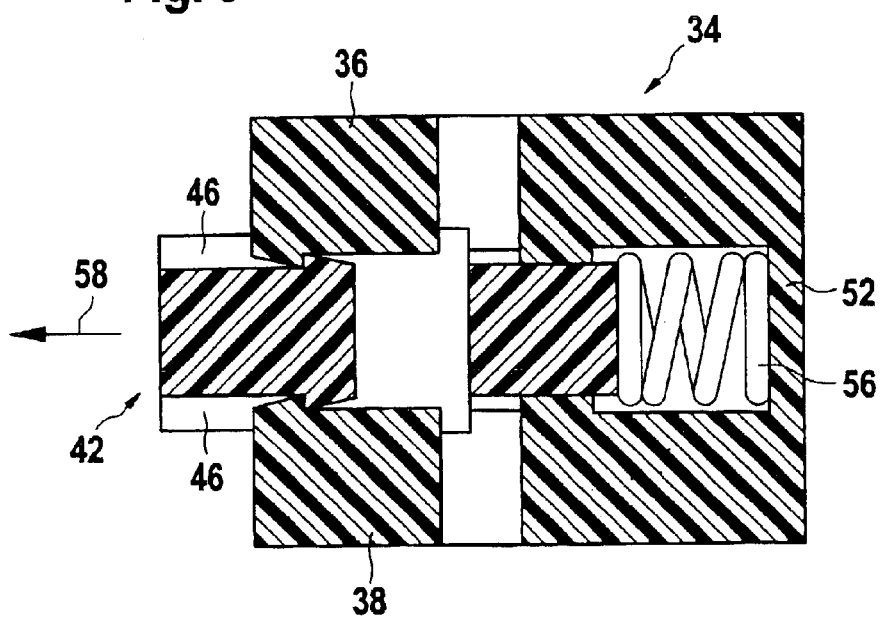
FIG. 9 shows a sectional drawing along the line IX—IX in FIG. 4.
Figure 10:
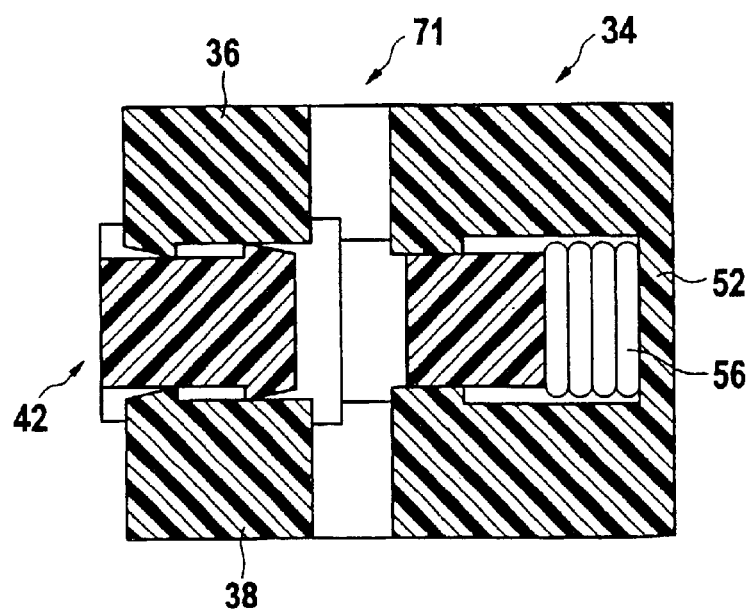
FIG. 10 shows the arrangement according to FIG. 9 in the position according to FIG. 5.
Figure 11:
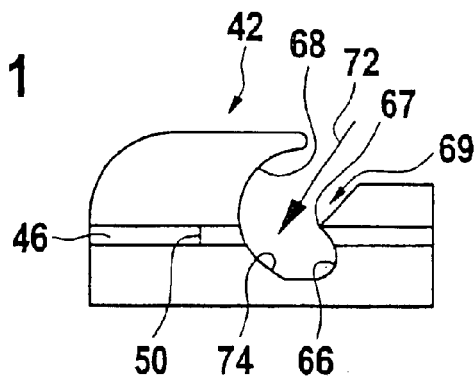
FIG. 11 shows a side view of a locking slide belonging to the wiper system.
Figure 12:
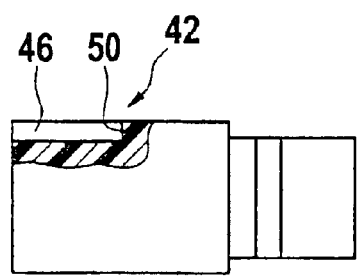
FIG. 12 shows a top view of the locking slide according to FIG. 11, partially cut.
Figure 13:
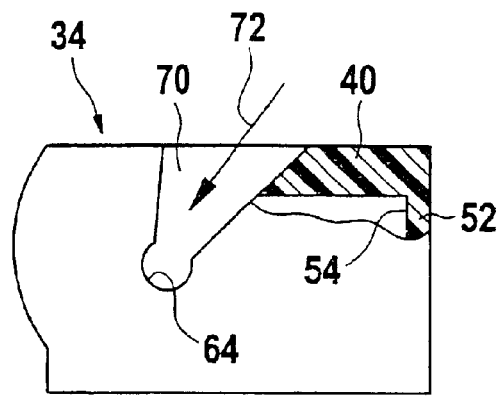
FIG. 13 is a side view of a coupling part belonging to a wiper system along the line XIII—XIII in FIG. 14, partially cut.
Figure 14:
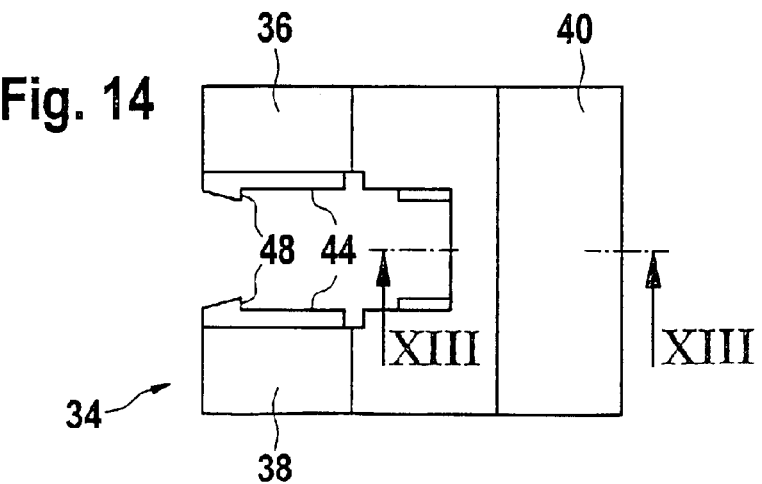

The special embodiment of the wiper system 10 according to the invention shall now be discussed in greater detail hereinbelow. The wiper blade-side coupling part 26 of the connection device 18 is designed as a double component. It has a housing part 34 (FIGS. 13 and 14) with two parallel guide walls 36 and 38 situated at a distance from each other and extending in the longitudinal direction of the wiper blade 12, which said guide walls are interconnected at its one end section by means of a bridge-like member 40 ensuring the stability of the housing part. The two inner sides of the guide walls 36, 38 facing each other form guide surfaces for a slide-like locking element 42 (FIGS. 11 and 12) that also belongs to the coupling part 26. To ensure a defined working motion for the locking slide 42, a strip-like projection 44 extending in the longitudinal direction of the wiper blade is located on each of the inner sides of the guide walls 36, 38 facing each other. To ensure a defined working motion, longitudinal grooves 46 located on the locking slide 42 and matched to the cross section of the projections 44 are associated with the strip-like projections 44. The slide-like locking element 42 can therefore be slid, without play, between the guide walls 36 and 38 in the longitudinal direction of the wiper blade. To secure the locking slide 42 in the housing part 34, a limiting shoulder 48 pointing in the direction opposite from the working motion is located on each of the two projections 44. The two limiting shoulders 48 cooperate with counter-shoulders located on the locking slide in its longitudinal grooves in the sense of limiting the working motion. On the end section of the housing part 34 provided with the bridge 40, said end section is provided with an end wall 52, the inner side 54 of which faces the limiting shoulders 48 at a distance. A helical coiled spring 56 is supported on the inner side 54 in preloaded fashion (FIGS. 4 and 9), which said helical coiled spring pushes the locking slide 42 built into the housing part 34 in the direction of the arrow 58 (FIG. 9), whereby the limiting shoulders 48 catch the locking slide 42 at its counter-shoulders 50 when it has reached its locked position. The helical coiled spring 56 is thereby still under a slight preload. In an operating position of the connection device 18 shown in FIG. 4, the limiting shoulders 48 are situated at a slight distance away from the counter-shoulders 50. This means that the locking slide 42 serving as a locking element is moved slightly in the direction of the arrow 60 (FIG. 4) against the working direction of the helical coiled spring 56. In this operating position, the coupling part 26 is penetrated by a bore-like bearing receptacle for the pivot bolt 24 transversely to the direction of motion of the locking slide 42. The bearing receptacle 62 therefore penetrates both guide walls 36, 38 and the locking slide 42. To facilitate a better understanding, the pivot bolt 24 has been drawn in cross section in FIG. 4. The recesses in the guide walls 36, 38 resulting thereby are complemented by the recess 66 resulting in the locking slide 42 in its locked position and approximately form a circle that is matched to the cross section of the pivot bolt. So that the locking slide can be moved in the direction of the arrow 60 from its operating position shown in FIG. 4 into an open position (FIG. 5), it is provided with a recess 68 on the side opposite from its recess 66. The recess is selected so large in size that it forms a pass-through channel section for the pivot bolt. The recesses 64 in the guide walls 36, 38 are also opened in the manner of a funnel via pass-through channel sections 70 (FIG. 13). The width of the pass-through channel sections is selected so that the pivot bolt 24 can be inserted easily into the wall-side recesses 64 in the direction of the arrow 72 (FIG. 13). As a result of the recess 68 in the locking slide 42 that is dimensioned accordingly, the pivot bolt 24 can also easily reach the bearing recess 66 in the locking slide 42 (FIG. 11). This is only possible, however, when the locking slide 42 is moved into its open position shown in FIG. 5 in the direction of the arrow 60 (FIG. 5) against the clamping force of the helical coiled spring 56. In this open position, a pass-through channel 71 for the pivot bolt results, which said pivot bolt extends over the entire width of the housing part, including the locking slide 42 guided in said housing part. The bearing receptacle sections formed in this fashion and arranged in tandem in the direction of the axis of the pivot bolt 24—which said bearing receptacle sections are formed by the recesses 64 and 66 in the housing part 26 and by the recess 68, 69 in the locking slide 42—bare therefore open toward the side of the coupling part 26 opposite from the window. The width of each section is thereby greater than the diameter of the pivot bolt. The recess 66 in the locking slide 42 is provided with a starting incline 74 that is opposite from the recess 66 at a distance and that forms an acute angle α with the direction of displacement of the locking element (FIG. 8).

Figure 3:
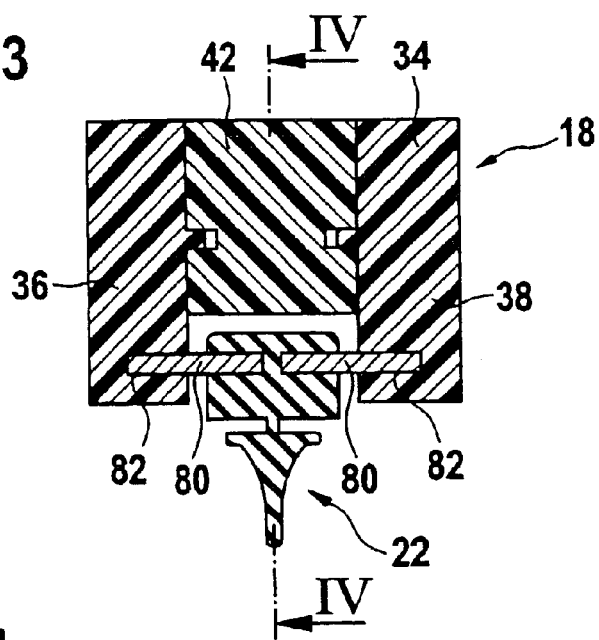
FIG. 3 shows a cross section through the wiper blade along the line III—III in FIG. 2.

It is obvious in FIGS. 2 and 3 that the wiper blade-side coupling part 26 of the connection device 18 is interconnected with the carrier element 14 sitting on the top band surface 13 of the carrier element 14. In the region of the line of cut III—III, the carrier element 14 has two spring strips 80 gripping the wiper strip and located at a distance from each other and parallel to each other, the inside edges of which reach into the longitudinal grooves of the wiper strip 22, and the outer edges of which are gripped by longitudinal grooves 82 present in the guide walls 36 and 38. The arrangement of the wiper strip 22 is thereby affected such that it does not bear against the locking slide 42 and influence its working motion. As illustrated in FIG. 2, the wiper arm 20 has a U-shaped cross section on its exposed end 21. It therefore has two side walls situated at a distance from each other and parallel to each other, which said side walls are situated standing upright toward the window. The two ends of the pivot bolt 24 are fixed at the side walls 84. The distance 83 between the inner sides of the side walls 84 facing each other is matched to the width 85 of the housing part 34 in such a fashion that the side walls 84 overlap the outer sides of the guide walls 36, 38 in a manner that is free from play. Excellent lateral stability for the wiper blade on the wiper arm therefore results when the wiper system 10 is moved in the direction of the double arrow 88 (FIG. 2) over the window to be wiped.

Figure 6:
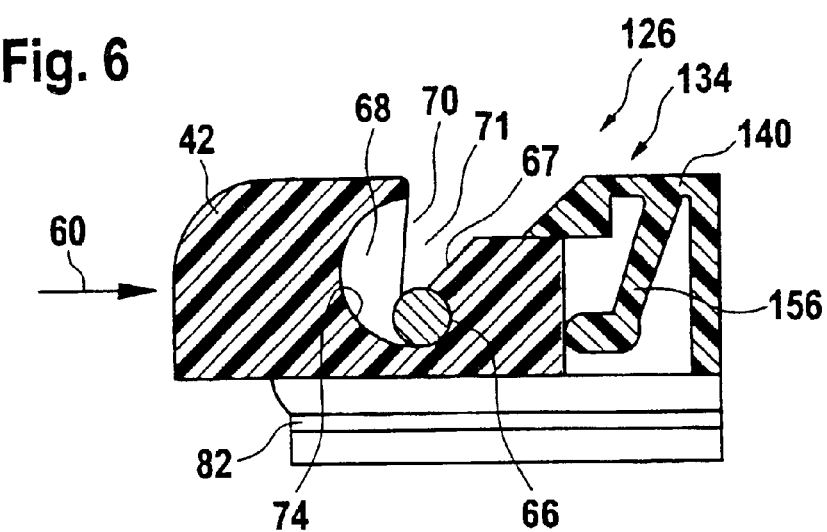
FIG. 6 shows another embodiment of the arrangement according to FIG. 4.
Figure 7:
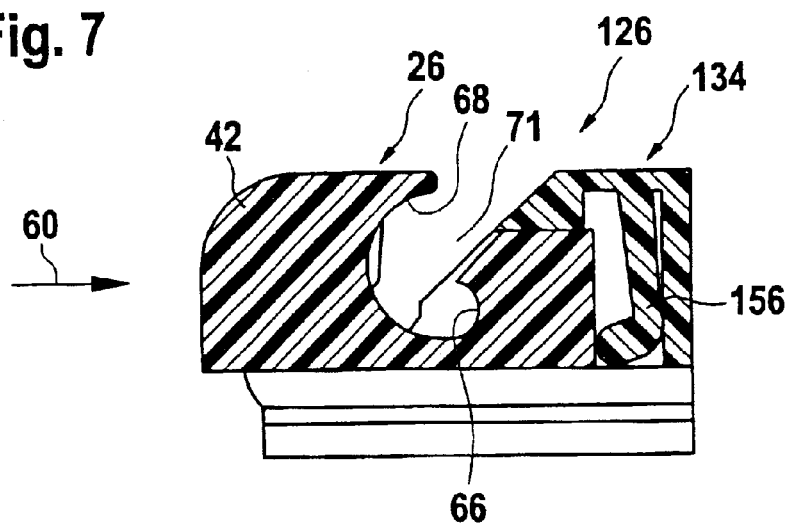
FIG. 7 shows the arrangement according to FIG. 6 in the detaching position.

An alternative to the arrangement of a helical coiled spring illustrated previously is shown in FIGS. 6 and 7. Since this other exemplary embodiment differs from the exemplary embodiment described with reference to FIGS. 4 and 5 only in terms of the design of the spring means, the reference numerals used previously for the locking slide will be used again here. The coupling part 126 according to FIGS. 6 and 7 also has a housing part 134 and a locking slide 42 with the corresponding bearing receptacles 62, pass-through channels 71 and recesses. The locking slide 42 also has a recess 68 with the starting incline 74. The housing part 134 is produced out of an elastic plastic, however. A leg spring 156 is integrally molded to the bridge connecting the two guide walls 36 and 38, which said leg spring performs the function of the helical coiled spring 56 in the exemplary embodiment according to FIGS. 4 and 5. The leg spring 156 is adjusted so that it still bears against the locking slide 42 with preload in the operating position (locked position) shown in FIG. 6. When the locking slide 42 is moved in the direction of the arrow 60 and is brought into its open position shown in FIG. 7, the leg spring 56 deflects with increasing tension, so that the locking slide 42 exposes the pass-through channel sections.

In addition to further described features, the wiper system 10 according to the invention also has a bore-like bearing receptacle 62 for the pivot bolt 24, whereby the bearing receptacle is open-edged along its cylindrical surface over a pass-through channel 71 pointing in the direction of the bore axis. The pass-through channel is divided into three different sections, whereby one section 70 each is located in the guide walls 36, 38, and a third section 68, 69 is located in the locking slide 42. The pass-through channel sections in the two guide walls 36 and 38 has a width 90 in the region of the bearing receptacle 62 (FIG. 8) that is somewhat greater than the diameter 92 of the pivot bolt 24.

When the loose wiper blade 12 is to be attached to the wiper arm 20, it is moved into the position shown in FIG. 2. The wiper blade is then moved upward toward the pivot bolt 24, whereby the funnel-shaped recess 64 in the guide walls 36, 38—together with the side walls 84 of the wiper arm end 21 sliding along the outer sides of the guide walls in the direction of the arrow 72 (FIG. 8)—act as a very good installation aid. In this installation motion, the locking slide 42 is displaced by the pivot bolt 23 in the direction of the arrow 60—while the tension of the spring means 56 and 156 increases—until the pivot bolt 24 reaches its bearing receptacle 62 formed by the recesses 64 and 66 (open position). The locking slide then snaps into its operating position shown in FIG. 4 under the effect of the spring means 56 and 156, which is now substantially preloaded. The locking slide 42, with the upper edge 67 of its recess 66, now constricts the pass-through channel to a bottleneck 94 (FIG. 4), the width of which is less than the diameter of the pivot bolt 23, so that the wiper blade 12 can no longer be detached from the wiper arm 20 (locked position). The pivot bolt is then practically enclosed by parts of the coupling part 24.

Figure 5:
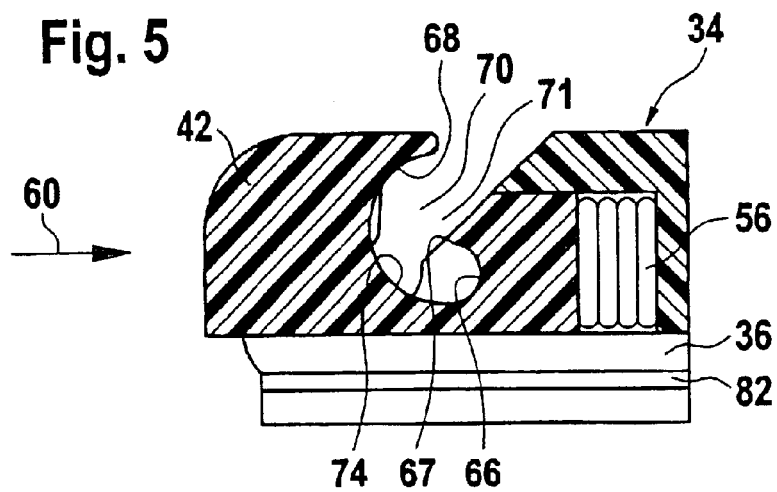
FIG. 5 shows the arrangement according to FIG. 4 drawn in the detaching position.

To detach the wiper blade 12 from the wiper arm 20, the locking slide 42 must be moved in the direction of the arrow 60 while the bottleneck 94 expands elastically, whereby the starting incline 74 of the locking slide 42 impacts the pivot bolt 24 and lifts it out of its bearing receptacle 62, as illustrated in FIG. 8. As FIG. 8 further shows, in this position, the bottleneck 94 is already expanded so far that its width 90 is already greater than the diameter 92 of the pivot bolt 24 (open position). Accordingly, the wiper blade can be immediately detached from the pivot bolt, and, therefore, from the wiper arm, in the direction opposite from the direction of the arrow 72. The wiper system is therefore unique in that the coupling part 26 is provided with a separate locking element 42 to form the bottleneck 94, which said locking element is capable of being moved, against the return force (arrow 96), out of its locked position—which corresponds to the operating position—that blocks the pass-through channel into an open position that exposes the pass-through channel (FIGS. 5 and 8).

What is claimed is:

1. A wiper system, in particular for motor vehicle windows, comprising a driveable wiper arm, (20) guided at one end on the motor vehicle, wherein, on an exposed end (21) of said wiper arm, a wiper blade (12) capable of being placed against the window (16) with a wiper strip (22) is detachably hinge-mounted via a connection device (18), wherein said connection device has a pivot bolt (24) on an arm side, wherein an axis of articulation of said pivot bolt extends substantially transversely to a longitudinal direction of the wiper blade in a working direction of the wiper system (10), and which has a coupling part (28) with a bore-type bearing receptacle (62) for the pivot bolt (24) on a wiper blade side in the center section of the wiper blade on a side opposite from the window, whereby the bearing receptacle (62) is open-edged along a cylindrical surface over a pass-through channel (70) for the pivot bolt pointing in the direction of the bore axis, wherein said bearing receptacle is provided with a bottleneck (94) capable of being expanded elastically to a diameter (92) of the pivot bolt, wherein the width of said bottleneck is smaller than the diameter of the bearing receptacle, wherein the coupling part (26) is provided with a separate locking element (42) to form the bottleneck, wherein said locking element is capable of being moved, against a return force (96), from a locked position that blocks the pass-through channel into an open position that exposes the pass-through channel, wherein the bearing receptacle (62) for the pivot bolt (24) of the wiper arm (20) penetrates two guide walls (36, 38) and the locking element (42), whereby recesses (64, 66) adapted to a cross section of the pivot bolt in the guide walls and in the locking element located in the locked position complement each other to at least approximately form a circle as viewed in the direction of the axis of articulation, wherein each of the bearing receptacle sections is open over one pass-through channel section toward a side of the coupling part (26) opposite from the window, whereby the width of each section is greater than the diameter of the pivot bolt (24), wherein the locking element (42) is loaded toward the locked position by spring means supported at the housing part (34), and wherein the spring means are formed by a leg spring (156) interconnected as a single component with the housing part (134) composed of an elastic plastic.

2. The wiper system according to claim 1, wherein the coupling part (26) has a housing part (34) permanently interconnected with the wiper blade (12), wherein on said housing part, the locking element (42) is displaceably guided in the longitudinal direction of the wiper blade (12).

3. The wiper system according to claim 2, wherein the housing part (34) has two guide walls (36, 38) extending in the longitudinal direction of the wiper blade located at a distance from each other, wherein the locking element (42) is displaceably guided between said two guide walls.

4. The wiper system according to claim 3, wherein the two guide walls (36, 38) are interconnected at an end section of the housing part (34) by means of a bridge (40).

5. The wiper system according to claim 2, wherein the housing part (34) is provided with means (44) for ensuring a defined working motion for the locking element (42) located at a distance from the wiper strip (22).

6. The wiper system according to claim 5, wherein a limiting shoulder (48) is located on the housing part (26) oriented in a direction against the working motion that cooperates with a counter-shoulder (50) located on the locking element (42).

7. The wiper system according to claim 1, wherein the bearing section of the locking element (66) is provided with a starting incline (74) that faces the recess (66) in said bearing section at a distance and which forms an acute angle (Δ) with a direction of displacement (60) of the locking element.

8. The wiper system according to claim 1, wherein the wiper arm (20), at least in the region of the pivot bolt (24), has two side walls (84) located at a distance from each other and parallel to each other that are situated standing upright to the window (16) and to which the ends of the pivot bolt (24) are secured, and the distance (83) between the two side walls is matched to the width (86) of the coupling part (26).

9. The wiper system according to claim 1, wherein the coupling part (34) is held on a top band surface of a spring-elastic carrier element opposite from the window (16), whereby the coupling part lies flat on said carrier element at least over one subsection, and a rubber-elastic wiper strip (22) capable of being placed against the window is located parallel to the longitudinal axis on another bottom band surface (15) of the carrier element (14) facing the window.

10. A wiper system, in particular for motor vehicle windows, comprising a driveable wiper arm (20) guided at one end on the motor vehicle, wherein, on an exposed end (21) of said wiper arm, a wiper blade (12) capable of being placed against the window (16) with a wiper strip (22) is detachably hinge-mounted via a connection device (18), wherein said connection device has a pivot bolt (24) on an arm side, wherein an axis of articulation of said pivot bolt extends substantially transversely to a longitudinal direction of the wiper blade in a working direction of the wiper system (10), and which has a coupling part (26) with a bore-type bearing receptacle (62) for the pivot bolt (24) on a wiper blade side in the center section of the wiper blade on a side opposite from the window, whereby the bearing receptacle (62) is open-edged along a cylindrical surface over a pass-through channel (70) for the pivot bolt pointing in the direction of the bore axis, wherein said bearing receptacle as provided with a bottleneck (94) capable of being expanded elastically to a diameter (92) of the pivot bolt, wherein the width of said bottleneck is smaller than the diameter of the bearing receptacle, wherein the coupling part (26) is provided with a separate locking element (42) to form the bottleneck, wherein said locking element is capable of being moved, against a return force (96), from a looked position that blocks the pass-through channel into an open position that exposes the pass-through channel, wherein the coupling part (26) has a housing part (34) permanently interconnected with the wiper blade (12), wherein on said housing part, the locking element (42) is displaceably guided in the longitudinal direction of the wiper blade (12), wherein the housing part (34) is provided with means (44) for securing a defined working motion for the locking element (42) located at a distance from the wiper strip (22), wherein said securing means are formed by at least one strip-like projection (44) on an inside of one guide wall (36, 38) that extends in the direction of the working motion of the locking element (42), and wherein a longitudinal groove (46) matched to a arose section of the projection on a side wall of the locking element (42) facing the projection is associated with the projection.

11. The wiper system according to claim 10, wherein the spring means are formed by a helical compression spring (56).

* * * * *